Dec. 30, 1958 R. B. TROUSDALE 2,866,909
ELECTRONIC SWITCH
Filed Jan. 17, 1957
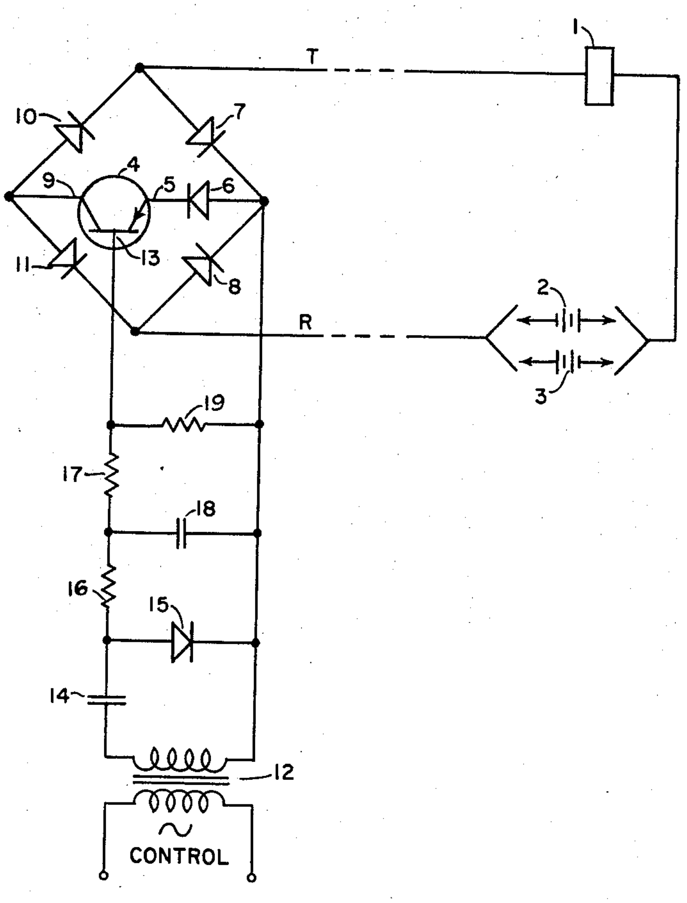
INVENTOR.
ROBERT B. TROUSDALE
BY F. H. Henson
AGENT 2,866,909

ELECTRONIC SWITCH

Robert B. Trousdale, Downey, Calif., assignor to General Dynamics Corporation, Rochester, N. Y., a corporation of Delaware Application January 17, 1957, Serial No. 634,649

5 Claims. (Cl. 307—88.5)

This invention relates in general to electronic switches and, more particularly, to electronic switches which comprise transistors as principal elements.

The electronic switch herein disclosed may be used, for example, as an output pulsing relay for an electronic register sender which is required to repeat line selecting pulses to the outgoing pulsing relay in an operator's outdial trunk, or over a trunk line to a foreign battery circuit in a distant telephone office. As is well known in the telephone art, line seizure supervision is conventionally repeated from one office over a trunk line to a distant office by closing a pair of mechanical relay contacts in the outgoing office to effect seizure of the incoming equipment at the distant office and the contacts are then opened and reclosed to repeat each pulse of line selecting information to the distant office. If signaling is performed on a loop basis, the tip and ring conductors of the trunk line are conventionally connected through first and second windings of an incoming pulsing relay at the distant office to ground and negative battery potential, respectively. If simplexed or composited trunk lines are used, signaling is conventionally performed by closing either negative battery or ground to the near end of the dial leg to operate a ground or battery connected pulsing relay, respectively, in the distant office. The relay contacts in the originating office are, of course, electrically isolated from the circuit which controls the energization of their associated relay winding so that the operation of the relay in the distant office is in no way influenced by the operating circuit for the relay winding in the outgoing office.

Thus, it can be seen that at the point of connection between electronic and electromechanical systems, it is necessary to provide an electronic switch which is the full equivalent of a pair of mechanical relay contacts. Many electronic switches have been proposed in the prior art for many purposes, but, to my knowledge, none of these switches are capable of performing all of the functions which can be performed by a pair of mechanical relay contacts.

Accordingly, it is the general object of this invention to provide a new and improved electronic switch.

It is a more particular object of this invention to provide a new and improved electronic switch which may serve as a pulsing relay in applications where the controlled circuit may be of either polarity and where no direct current flow is permissible between the controlled circuit and the pulsing relay driving circuit.

In accordance with this invention, the emitter and collector junctions of a junction transistor are connected in series across one diagonal and the line to be closed is connected across the other diagonal of a full bridge rectifier circuit. Thus, the transistor is always presented the correct polarity of operating potential regardless of the polarity of the battery connected to the line through a relay or load impedance at the distant end of the line. Biasing potential for holding the transistor normally non-conductive is derived from the line by the expedient of returning the emitter and base of the transistor through a silicon diode and a resistor, respectively, to the same point of the full bridge rectifier circuit. The silicon diode is poled in the forward direction for emitter current flow and, due to the very small emitter-collector current flow when the transistor is biased for nonconduction, the diode has approximately six-tenths of a volt drop thereacross. Drive can be any alternating current or pulsating current signal which is coupled to the switch through transformer windings, or any other direct current isolating device. The alternating current signal induced in the secondary winding of the coupling transformer is rectified, filtered, and applied to the base of the transistor to overcome the off bias and thus render the transistor conductive. Load current flows through two of the bridge diodes, the silicon diode, and the emitter to collector circuit of the saturated transistor.

Further objects and advantages of the invention will become apparent as the following description proceeds, and features of novelty which characterize the invention will be pointed out in particularity in the claims annexed to and forming a part of this specification.

For a more complete understanding of the invention, reference may be had to the accompanying drawing which shows an electronic switch for controlling the opening and closing of a two-conductor line.

Referring to the drawing, it can be seen that a single winding relay 1 is shown connected in series with either battery 2 or battery 3 across a two-conductor line comprising conductors T and R. When battery 2 is used, the tip conductor T is positive and the ring conductor R is negative. When battery 3 is used, conductor T is negative and conductor R is positive. In telephone practice, the positive terminal of the battery is grounded and is referred to as ground potential, while the ungrounded or negative terminal of the battery is referred to as battery potential.

It will be understood, of course, that the disclosed embodiment is intended as an example only. For example, relay 1 could be a two-winding relay with ground or battery connected through a first winding to conductor T, and battery or ground, respectively, connected through a second winding to conductor R, or relay 1 could be a single winding, ground or battery connected relay controlled over a single conductor with the near end of the line or dial leg connected to battery or ground, respectively, through the conducting transistor. Also, it will be noted that transistor 4 has been shown as a p-n-p junction transistor. Transistor 4 could be a n-p-n transistor and would function in the illustrated circuit by merely reversing all of the illustated unidirectional conducting devices or crystal diodes.

It can be seen that emitter 5 of transistor 4 is coupled through diode 6, which may be a silicon diode of type TI–660, and through either diode 7 to conductor T, or through diode 8 to conductor R. Similarly, collector 9 of transistor 4 is coupled through either diode 10 to conductor T, or through diode 11 to conductor R. Regardless of the polarity of the line conductors, the emitter 5 is always returned to ground or positive potential and collector 9 is returned to negative potential. Thus, tne transistor is always presented the correct potential for operation.

If it be assumed that no drive or control signal is applied to the primary winding of transformer 12, transistor 4 is biased for non-conduction since emitter 5 is held approximately six-tenths of a volt negative with respect to base 13, which is returned through resistor 19 to ground potential appearing at the second or cathode terminals of diodes 7 and 8. The voltage drop across diode 6 is caused by the very small current flow from the positive terminal of battery 2, through the winding of relay 1, diode 7, diode 6, the back impedance of the emitter-base junction and the collector-base junction of transistor 4, and through diode 11 to the negative terminal of battery 2. Silicon diode 6 acts much like a voltage regulator tube in that it has an energy gap voltage drop of approximately six-tenths of a volt for all values of forward current exceeding a very small amount, as fully described in Trousdale Patent 2,810,080, which is assigned to the same assignee as the present invention.

Transistor 4 is rendered conductive only when an alternating current or pulsating current signal is applied to the primary winding of transformer 12. The control signal may be transmitted directly by the sender, or, if the sender transmits direct current signals, the direct current signals may be utilized to drive a multivibrator or blocking oscillator or any other device suitable for generating the control signal applied to the primary winding of transformer 12. The signal induced in the secondary winding of transformer 12 is coupled through capacitor 14, rectified by diode 15, and filtered by the T-type filter, comprising resistors 16 and 17 and capacitor 18. The resulting negative direct current signal is applied to the base 13 of transistor 4. Under these conditions, transistor 4 is rendered fully conductive and relay 1 is operated over the previously described loop circuit from the positive terminal of battery 2, through its winding, diodes 7 and 6, the emitter-collector circuit of transistor 4, and through diode 11 to the negative terminal of battery 2. During each interruption of the input control signal, transistor 4 is rendered non-conductive and relay 1 is released to repeat the line selecting information in the distant office.

It can be seen that an electronic switch has been provided which is the full equivalent of a pair of relay contacts. In addition, the switch disclosed is faster in operation than the conventional electromechanical relay and is not subject to contact bounce and other mechanical difficulties encountered when relay contacts are used.

In a tested embodiment of the invention, transistor 12 was type 2N-141, diodes 7, 8, 10, 11 and 15 were of type 1N-305, resistors 16 and 17 had a value of 470 ohms, resistor 19 had a value of 270 ohms, and capacitors 14 and 18 had a value of .25 microfarad. The alternating current control signal was derived from a transistor blocking oscillator operating at about 10 kilocycles.

While there has been shown and described what is at present considered to be the preferred embodiment of the invention, other modifications will readily occur to those skilled in the art. It is not, therefore, desired that the invention be limited to the specific arrangement shown and described, and it is intended to cover in the appended claims all such modifications as fall within the true spirit and scope of the invention.

What is claimed is:

1. In combination, a line having first and second conductors, a load impedance, a source of potential, means for connecting said load impedance and said source of potential in series between said first and second conductors, first, second, third, fourth, and fifth unidirectional conducting devices, each of said devices having first and second terminals, a transistor having a base, an emitter, and a collector, means for connecting the first terminals of said first and second devices to said first and second conductors, respectively, means for connecting the second terminals of said third and fourth devices to said first and second conductors, respectively, means for connecting the first terminal of said fifth device to the second terminals of said first and second devices, means for connecting the second terminal of said fifth device to said emitter, means for connecting said collector to the first terminals of said third and fourth devices, means for connecting said base to the second terminals of said first and second devices for normally biasing said transistor for nonconduction, and means for applying a control potential to said base for biasing said transistor for conduction.

2. The combination of claim 1 in which the means for connecting said base to the second terminals of said first and second devices comprises a resistor.

3. In combination, a line having first and second conductors, a load impedance, a source of potential, means for connecting said load impedance and said source of potential in series between said first and second conductors, first, second, third, and fourth unidirectional conducting devices, each of said devices having first and second terminals, a transistor having a base, an emitter, and a collector, means for connecting the first terminals of said first and second devices to said first and second conductors respectively, means for connecting said emitter to the second terminals of said first and second devices, means for connecting said collector to the first terminals of said third and fourth devices, means for connecting the second terminals of said third and fourth devices to said first and second conductors respectively, means for connecting said base to the second terminals of said first and second devices for normally biasing said transistor for non-conduction, a rectifier circuit, means for coupling an alternating current signal to said rectifier circuit through a coupling device of the type which presents an infinite impedance to signals of zero frequency and a finite impedance to signals above zero frequency, and means for applying the rectified signal appearing in the output of said rectifier circuit to said base for biasing said transistor for conduction.

4. The combination of claim 3 in which the means for connecting said emitter to the second terminals of said first and second devices comprises a fifth unidirectional conducting device having first and second terminals, the first terminal of said fifth device being connected to the second terminals of said first and second devices, and the second terminal of said fifth device being connected to said emitter.

5. The combination of claim 4 in which the means for connecting said base to the second terminals of said first and second devices comprises a resistor.

References Cited in the file of this patent

UNITED STATES PATENTS

| | | |
|---|---|---|
| 2,275,308 | Niemann | Mar. 3, 1942 |
| 2,629,834 | Trent | Feb. 24, 1953 |